United States Patent
Kufner et al.

(10) Patent No.: US 9,671,561 B2
(45) Date of Patent: Jun. 6, 2017

(54) METHOD FOR APPLYING A COATING ONTO AN END FACE OF AN OPTICAL COMPONENT FOR GUIDING LIGHT AND OPTICAL COMPONENT

(71) Applicant: LEONI KABEL HOLDING GMBH, Nuremberg (DE)

(72) Inventors: Stefan Kufner, Sonnefeld (DE); Sebastian Haaf, Coburg (DE)

(73) Assignee: LEONI Kabel Holding GmbH, Nuernberg (DE)

( * ) Notice: Subject to any disclaimer, the term of this patent is extended or adjusted under 35 U.S.C. 154(b) by 0 days.

(21) Appl. No.: 15/068,863

(22) Filed: Mar. 14, 2016

(65) Prior Publication Data
US 2016/0264460 A1    Sep. 15, 2016

(30) Foreign Application Priority Data
Mar. 13, 2015   (DE) .................... 10 2015 204 541

(51) Int. Cl.
G02B 6/02    (2006.01)
G02B 6/24    (2006.01)
C03C 25/10   (2006.01)

(52) U.S. Cl.
CPC ............ G02B 6/241 (2013.01); C03C 25/108 (2013.01)

(58) Field of Classification Search
CPC ..................................................... G02B 6/241
See application file for complete search history.

(56) References Cited

U.S. PATENT DOCUMENTS

| 7,187,816 B2 | 3/2007 | Huang |
| 2004/0120646 A1* | 6/2004 | Fushimi .............. G02B 6/262 385/38 |
| 2009/0153852 A1 | 6/2009 | Rensen |

FOREIGN PATENT DOCUMENTS

| DE | 102013202589 A1 | 2/2013 |
| JP | 2009265392 A | 11/2009 |

OTHER PUBLICATIONS

Abeysinghe, D.C., "Novel MEMS Pressure and Temperature Sensors Fabricated on Optical Fibers", Dissertation. Division of Research and Advanced and Advanced Studies of the University of Cincinnati, 2001, pp. 1-188.

* cited by examiner

*Primary Examiner* — Sung Pak
*Assistant Examiner* — Hoang Tran
(74) *Attorney, Agent, or Firm* — Laurence A. Greenberg; Werner H. Stemer; Ralph E. Locher (57) ABSTRACT

A coating is applied on a first end face of an optical component which includes a cladding and a core for guiding light. The first end face has a cladding front face and a core front face. The core front face is covered with a mask, the coating is applied onto the first end face, the coating s removed from the masked core front face, and for covering the core front face, a lacquer layer made of a photo resist is applied onto the first end face. The photo resist is exposed to light from the rear side only in the region of one of the front faces such that light is input on the second end face of the component only in one of the two regions, and the lacquer layer is subsequently selectively removed.

12 Claims, 5 Drawing Sheets

METHOD FOR APPLYING A COATING ONTO AN END FACE OF AN OPTICAL COMPONENT FOR GUIDING LIGHT AND OPTICAL COMPONENT

BACKGROUND OF THE INVENTION

Field of the Invention

The invention relates to a method for applying a coating onto a first end face of an optical component for guiding light, and to such a component.

An optical component for guiding light typically serves for transmitting light, for example also for mixing light from a plurality of light sources. To this end, the component has two functional regions, specifically a core as the actual waveguide in which the light is intended to be guided and in particular mixed, and a cladding surrounding the core. The cladding is here typically manufactured from a material having a lower refractive index than the core and thus permits a restriction on the propagation of the light to the core owing to total internal reflection.

The component typically extends in a longitudinal direction and has, transversely thereto, a, for example, circular cross section, in the center of which the core is arranged. In principle, however, any desired cross-sectional geometries, arrangements and profiles are conceivable both for the core and for the cladding. In particular, a component that is designed as what is referred to as a light mixer comprises a non-circular, polygonal, in particular hexagonal, core which permits particularly good mixing of light that is input into the core from one or more light sources. It is also possible in principle for a component to have a plurality of cores.

The required difference in refractive indices is, in a typical embodiment, realized by the choice of correspondingly different materials for the core and the cladding. However, it is alternatively also possible to use only a single material as the base material and to modify it locally to form the core. In the case of a blank made of such a material, the refractive index is changed merely in a subregion by way of chemical or physical action and the core is formed in this way. The action is, for example, doping or a mechanical or thermal treatment. Frequently used materials are, for example, diverse glasses or quartz.

The component typically has at least two end faces, by which light is in each case input and/or output. The core and the cladding then in each case form on the end face a front face, specifically a core front face and a cladding front face. In some embodiments, an in particular accidental input of light into the cladding is intended to be prevented. In an exemplary application, light from one or more light sources is guided using a light mixer to a ceramic in order to excite said ceramic using the light and to thus generate fluorescent light. The risk is here that the fluorescent light is guided back by the component, in particular by the cladding thereof; however, this is intended to be prevented.

In this context, it is known to provide the cladding front face, i.e. correspondingly one of the end faces, with a coating by way of omitting the core front face, for example with an absorbing or reflective layer which prevents light being input. Typically, to this end, firstly the core front face is covered with a mask, i.e. masked, subsequently the coating is applied, for example vapor deposited, onto the entire end face, and subsequently the coating is selectively removed from the masked region by way of removing the mask.

For masking purposes, i.e. for covering using a mask, in principle two approaches are known: In a first approach, a lacquer is dripped onto the core front face to form the mask. In particular in non-circular cross sections, however, this inevitably results in an overhang of the mask in the peripheral region of the core, as a result of which correspondingly also part of the cladding is unintentionally masked. Vice versa, it is also possible for the core to be masked only incompletely and correspondingly coated, such that in that case, no optimum input of light into the core is possible. In a second approach, on the other hand, a photoresist is applied onto the entire end face, and said lacquer is exposed to light in the region of the core by way of an aperture. The exact alignment of the aperture, however, is complicated, in particular in the case of non-circular core cross sections. In addition, simultaneous manufacture of a plurality of coatings on a corresponding plurality of components is highly prone to errors owing to inaccurate positioning. The known methods are subsequently in need of improvement with respect to the accuracy during selective formation of the coating, in particular with respect to covering the core.

BRIEF SUMMARY OF THE INVENTION

Against this background, it is an object of the invention to improve the accuracy during coating of an end face of an optical component for guiding light. In particular, to this end, the accuracy when covering a core of the component is intended to be improved, in particular a core having any desired cross section. Furthermore, the intention is to specify an optical component having a correspondingly improved coating.

The object is achieved according to the invention by way of the claimed method, and by way of an optical component as claimed. Advantageous embodiments, further developments and variants are the subjects of the dependent claims. In this case, the advantages and embodiments mentioned in connection with the method apply analogously also to the component.

The method serves for applying a coating on a first end face of an optical component for guiding light, which furthermore also has a second end face. The component has two regions for guiding light, specifically a cladding and a core that is embedded therein, wherein the two regions extend in particular between the two end faces. The cladding and the core form both, on the first end face, in each case a front face, specifically the cladding forms a cladding front face and the core forms a core front face, wherein the two front faces together correspond in particular to the first end face. In the method, initially the core front face is covered by a mask, i.e. masked, and subsequently the coating is applied onto the first end face, i.e. in particular onto the cladding front face and onto the masked core front face. Subsequently, the coating is removed from the masked core front face, in particular by dissolving a mask that is formed from a lacquer layer for covering purposes, as a result of which in particular the core front face lies uncovered and the coating remains on the cladding front face only in particular as a cladding coating.

To cover, i.e. mask, the core front face, a lacquer layer made of a photoresist is applied onto the first end face, which photoresist is exposed to light from the rear side only in the region of one of the front faces, i.e. selectively. Selective exposure is carried out by light being input in the second end face of the component only in one of the two regions, i.e. either into the core or into the cladding. For covering purposes, the lacquer is subsequently removed selectively, as a result of which a mask is formed in particular from the lacquer layer, which mask covers only the core front face.

The advantages attained by way of the invention in particular are that the lacquer applied onto the first end face is exposed to light with a particularly high degree of accuracy and thus optimum coverage of the core front face is possible for the purposes of subsequent coating. The exposure of the lacquer is advantageously specified by the geometry, in particular the cross section, of the region of the component used for light-exposure; here, only that subregion of the lacquer is exposed which covers the front face associated with that region. An essential idea is here to also use the light guiding properties of the component for the highly accurate application of the light that is used for light-exposure of the lacquer. The contours of the front faces are thus simulated in optimum fashion, as a result of which a highly accurate covering of the core results. It is thus possible in particular at the boundary between the core front face and the cladding front face to obtain particularly exact light-exposure simulating the boundary.

Since the light-exposure is automatically matched to the geometries of the regions due to the principles involved, there is another advantage in particular in that non-circular cores can also be masked in optimum fashion. Owing to the overall improved covering, the result is then a correspondingly particularly high accuracy during the selective formation of the coating. In the case of a component that is selectively coated in this way, unintended input of light into the cladding during operation is then prevented particularly effectively.

During operation, the component is primarily used for guiding light which is guided within the core on the basis of total internal reflection. To this end, the core has in particular a higher refractive index than the cladding. The core extends in a longitudinal direction and is embedded in the cladding, i.e. surrounded by cladding transversely to the longitudinal direction. In addition, the core and the cladding have, transversely to the longitudinal direction, in each case a cross-section, specifically a core cross-section and cladding cross-section, which is formed in particular substantially identically to the respective front face. The two front faces together form the first end face of the component; the second end face is preferably formed correspondingly identically to the first end face, as a result of which the component is in particular rotationally symmetrical with respect to the longitudinal direction.

The core front face is masked by way of a photoresist known per se, which is applied initially as an in particular thin lacquer layer onto the entire first end face for example using a lacquer system by way of spinning or spraying. The lacquer can develop by way of exposure, in particular to UV light, and a subsequent dissolving step. For example light, in particular UV light from a light-emitting diode or a mercury-vapor lamp, is used for the exposure. As a result of the selective exposure, developed and non-developed subregions of the lacquer layer are formed, which react differently in a subsequent dissolving step that typically comprises chemical treatment. In other words, subregions which have been exposed differently are either dissolvable or non-dissolvable. The exposure thus defines the mask that remains after the lacquer has developed.

In principle, it is possible in the manner described above to directly mask the core front face. Alternatively it is also possible to initially mask the cladding front face and then, in a manner known per se, to invert the resulting mask by way of a second lacquer layer and suitable removal. In either case, after masking, a lacquer layer remains as a mask only on the core front face, and the cladding front face lies uncovered.

The selective light-exposure of the lacquer for the purpose of selective development takes place by way of selectively inputting light into the component. Selectively is generally in particular understood to mean that only one of the two regions and the associated front face are involved, that is to say either the cladding or the core. Preferably input into the core for the selective exposure of the core front face is only such light that is guided, on the basis of total internal reflection, within the core up to the core front face and here strikes the lacquer to be exposed. However, it is also possible alternatively for light to be input into the cladding, for light to be guided thereby and for the lacquer layer to be exposed only via the cladding front face. Exposure here takes place generally from the rear side, i.e. in particular outwardly from the component.

Depending on the embodiment of the lacquer layer, the lacquer layer is, in a respective variant, additionally treated thermally, for example after application in what is known as a soft-bake method, after the exposure in what is known as a post—exposure-bake method, or after the development in what is known as a hard-bake method.

The coating is a layer that is in particular absorbing or reflective, generally nontransparent, and is manufactured preferably from a metal, particularly preferably from chromium or titanium, and is then vapour-deposited in a particularly simple manner or sputtered on. The coating is correspondingly in particular between approximately 100 nm and 2000 nm thick, preferably between 200 nm and 300 nm. Depending on the application it is possible for the coating to be non-transparent only in a specific and limited spectral range. The coating is applied in particular onto the entire first end face, with the mask resulting in selective coating of the cladding front face, and direct coating of the core front face being prevented; rather, it is in particular the mask that is coated in the region of the core. Also conceivable in principle are other well-adhering, metallic, organic or inorganic layers which expediently have either a minimum absorbance of at least 95% or minimal reflectance of 95%, such that light entering from outside the component in the region of the cladding front face is prevented in any case.

In a subsequent step, the mask is removed with that part of the coating which is located thereon, for example by way of what is known as a lift-off method, which is known per se. The remaining part of the coating now only covers the cladding front face, and covers it in particular completely, such that the coating is formed as a cladding coating. In one advantageous further development, subsequently an additional functional coating is applied, in particular an antireflective coating, which is then advantageously applied automatically only onto the core front face owing to the selective coating.

Depending on the embodiment of the light source and its arrangement relative to the component during exposure, it is possible for light, although input into one region, to exceed the angle of total internal reflection and correspondingly pass into the other region. The disadvantageous result of this is unintended exposure of the lacquer on the correspondingly other front face. For this reason, the light for exposing the lacquer is expediently input into one of the two regions such that crosstalk of light into the other region and thus in particular onto the other front face is prevented. To this end, the light that is input into one of the two regions has in particular a sufficient measure of collimation, i.e. in particular an input light beam has a sufficiently small opening angle such that complete guidance of light in the one of the two regions is ensured. Here, the maximum opening angle that is still sufficient is dependent in particular on the choice of material and the dimensions of the component and of the two regions.

It is also in addition possible for the light to have a measure of collimation which is too great, i.e. in particular the input light has an opening angle that is too small, and the front face intended for exposure is correspondingly not completely illuminated. The light for exposing the lacquer is therefore preferably input into the one of the two regions such that the associated front face is completely illuminated on the rear side. To this end, the light is in particular sufficiently diffuse, in particular such that along the one of the two regions a substantially uniform distribution of the light at the corresponding front face is attained by reflection of the light at the boundary surfaces of said region. The opening angle of the light which is minimally still sufficient is dependent here in particular on the choice of material and dimensions of the component and of the two regions.

The light input into the selected region for the purposes of exposure is at the same time suitably thus sufficiently parallel and sufficiently diffuse to attain both optimum illumination of the corresponding front face and to avoid crosstalk into the other region.

In one suitable embodiment, the light for exposure is made available by way of a point light source, which is correspondingly diffuse and emits light advantageously in a sufficiently large opening angle.

In one expedient variant, the light is made available by way of a light source which has a transverse dimension that is smaller than a width of that region into which light is input, in particular smaller than a width of the core. As a result, in particular any overlap of the light source with the other region and corresponding input of light therein is avoided. In addition, adjustment of the light source is significantly simplified since exact overlap with the region to be illuminated is no longer necessary. The light source, which is smaller in terms of area, needs to be positioned only within the front face, which is greater by comparison therewith; the front face, however, is still completely uniformly illuminated owing to the guidance of light.

In the case of the core, the width, also referred to as the core width, corresponds in particular to a diameter of the core and in the case of a non-circular core in particular to a minimum diameter. In the case of the cladding, the width, also referred to as the cladding width, corresponds in particular to a minimum wall thickness of the cladding, i.e. to a minimum distance between the boundary surface with the core and an outer face of the cladding. The width is generally in particular perpendicular to the longitudinal direction. A transverse dimension is understood to mean in particular the diameter of that face via which the light source emits light. In a preferred embodiment, the transverse dimension is at most half the width. The core, for example, has a width of approximately 500 µm, and the light source has a transverse dimension of approximately 200 µm.

In one preferred embodiment, the light is made available by way of a light source and is input via a stop, which is arranged between the light source and the second end face. As a result, the collimation of the light is adjustable in a particularly optimum fashion, and is advantageously dependent on the choice of the light source. The stop then comprises an opening by means of which the opening angle of the light that is input into the selected region is adjustable in optimum fashion and suitable beam shaping is possible. In particular, an advantageous diffraction effect is produced at the stop, which results in particular in an enlargement of the opening angle and thus in a more diffuse exposure.

In one suitable variant, the light is made available by way of a light source and input via a stop which delimits a numerical aperture of the light source to a first numerical aperture which at most corresponds to a second numerical aperture of that region in which the light is input. As a result, particularly efficient input of the light is realized. Here, the respective numerical aperture is in particular a measure of the opening angle of the light that is emitted by the light source in particular in combination with the stop, or a measure of the acceptance angle of the region. By correspondingly matching the numerical apertures with respect to one another, it is in particular ensured that only sufficiently parallel light is input into the region, which is then guided through the region by way of total internal reflection.

The stop is preferably formed by a receiving means of a holder, in which the component is accommodated before the exposure and in particular during the entire method. What is realized here preferably in an advantageous manner is automated self-adjustment of the stop. This is the result owing to the principles involved in the formation of the holder which encloses the component at least sectionally, preferably in a form-fitting manner. To this end, for example the cross-section of the receiving means is selected such that the component is guided and, for example, centered within the receiving means. By inserting the component into the receiving means, it is thus automatically positioned correctly with respect to the stop.

In one suitable embodiment, the receiving means is configured as a blind hole, i.e. in the shape of a cup, having a base and a wall. The receiving means extends in an axial direction, which corresponds in particular to a longitudinal direction of an optical component that is inserted into the receiving means. In one suitable variant, the receiving means is configured to be rotationally symmetrical with respect to the axial direction, i.e. in particular cylindrical. The receiving means is preferably U-shaped along the axial direction in cross section, wherein the wall in that case forms two side legs and the base a central leg connecting the side legs. The wall extends around a hollow space in which the optical component, specifically a blank herefor, is inserted. The base delimits the hollow space in the axial direction and as a result forms in particular a resting surface for the second end face via which light for exposure is input. To this end, the base has a corresponding opening.

In particular owing to the above-mentioned significantly simplified adjustment and alignment of the light source and in particular also of the stop, manufacturing tolerances of the receiving means and/or of the component play no part; instead, rough adjustment during exposure is completely sufficient, in contrast to conventional coating methods. The stop and the receiving means are in addition configured to be preferably unipartite, i.e. configured as a single part. The base of the receiving means in this case is at the same time the stop.

In one advantageous alternative, the stop is a separate part which is inserted into a receiving means of a holder, in which in turn the component is accommodated before the exposure. As a result, the stop is advantageously interchangeable, and the receiving means can thus be matched to various components, in particular having different core diameters.

Furthermore, in one preferred further development, the stop is removed after the coating is formed, and then a further functional coating, in particular an antireflection coating, is applied, wherein the component continues to be held in the holder. To this end, the optical component is held in the receiving means advantageously in a force-fitting manner and is, for example, clamped therein.

In order to coat a plurality of components in a particularly effective manner, the holder has, in a further development, a plurality of receiving means for accommodating a plurality of components. Here, in particular each receiving means serves for accommodating one component. It is possible in this way in particular to manufacture a plurality of components at the same time.

The holder has, in a suitable embodiment, a plurality of receiving means, which are arranged in the manner of a matrix, i.e. in a two-dimensional field. The receiving means in this case preferably face in the same direction, such that the receiving means can be filled from a front side and be exposed to light from a rear side. Correspondingly, a plurality of blanks for optical components are inserted in each case into one receiving means via the front side of the holder during manufacture, or even clamped in, and then exposed to light from the rear side.

The holder or at least the receiving means are made of plastic or metal, for example. The plurality of receiving means are in particular interconnected, preferably stiffly, i.e. such that they cannot move relative to one another. It is particularly conceivable here for the receiving means to be configured either in multiple parts and then to be attached to one another, or for the receiving means to be unipartite, i.e. formed from one part, and continuous, such that additional attachment elements are not necessary.

The method is preferably a batch method in which a plurality of components are exposed to light at the same time and in particular also coated. This embodiment permits production of a particularly large number of optimally coated components in a particularly short period of time. In particular, the method can then also be carried out fully automatically, and manual intervention is no longer necessary.

In the batch method, the holder is suitably part of a machine which, during the production of the optical components, also effects automatic filling of the receiving means with blanks. The machine in particular also takes the exposed blanks from the holder. Alternatively, the holder is interchangeable and is passed on together with the blanks to a further machine for further processing.

The lacquer is suitably a negative lacquer or a positive lacquer and is selectively removed only from the nonexposed or the exposed front face. A negative lacquer is distinguished by the fact that, in the dissolving step, it dissolves only at the nonexposed locations, whereas a positive lacquer correspondingly dissolves at the exposed locations. If a negative lacquer is used, it is correspondingly possible for the core front face to be masked directly by exposure via the core or alternatively by exposure via the cladding and inverting by means of a second lacquer layer. If a positive lacquer is used, it is possible for the core front face to be masked directly by exposure via the cladding or alternatively by exposure via the cladding and subsequent inverting by means of a second lacquer layer.

The method is particularly suitable for an optical component having a core with a non-circular, i.e. in particular polygonal, core cross section, the core front face of which is non-circular. Such a core results in an advantageous mixing of the light in the sense that a particularly uniform distribution of the light in particular at the core front face is effected by way of reflections at the boundary surface. As a result, a particularly exact and uniform exposure is achieved, which then makes a correspondingly exact, selective coating possible. A core front face which is formed in the shape of a regular polygon having 4 to 10 edges, i.e. for example as a regular hexagon, is particularly suitable.

The optical component is preferably a waveguide rod, also referred to as an integrator rod, and made in particular of quartz. Such a waveguide rod is used in particular as a light mixer which distributes light, which is guided in the core, particularly uniformly in cross section and is correspondingly suitable for homogeneous illumination. To this end, the waveguide rod expediently has a non-circular core, having the advantages already described above.

The coating is advantageously effected in the shape and size of the cladding front face. The latter is thus covered particularly exactly by the coating, such that input of light into the component via the cladding front face is advantageously avoided. The coating in particular covers accordingly the entire cladding front face. The coating has, in the region of the core front face, a corresponding core-front-face-shaped opening, which is also referred to as the core opening. As a result, an opening contour of the coating is in turn formed which advantageously follows an outer contour of the core front face.

If the coating is formed in a method according to the prior art stated above, the coating is formed, in particular in the boundary region, such that it does not follow the form of the core front face, with the result that partial areas of the cladding front face are not covered by the coating and/or partial areas of the core front face are covered. By way of example, in a round core opening and a hexagonal core, an overlap of the core opening over the edges of the core front face is produced, such that in this region, the cladding front face is uncoated, and at the same time in the region of the corners of the hexagon the coating extends beyond the cladding front face and thus covers the corners of the core front face.

These partial areas, which are not coated in the intended manner and/or are not coated, together form a defective area, which is distinguished by a defective coating. In other words, a number of coated partial areas of the core front face and a number of uncoated partial areas of the cladding front face together form a defective area. This defective area is advantageously minimized in particular by way of the method described above, in particular by configuring the core opening such that it follows the form such that the opening contour of the coating corresponds to the outer contour of the core front face. Accordingly, the optical component has, in a preferred embodiment, a defective area which is no more than 1% greater than the core front face, and no more than 1% smaller than the core front face.

The core opening in particular has an opening width which is defined analogously to the width of the core front face. The opening width in that case preferably differs from the width of the core front face by no more than 1%. The core front face and the opening are arranged here in particular concentrically with respect to one another, such that a correspondingly symmetrical greater or smaller coverage results. In the case of a core front face having a width of for example 500 µm, the opening width is then no more than 5 µm greater or smaller, wherein then in particular the opening contour extends around the outer contour of the core front face at a distance of 2.5 µm, or vice versa.

In one preferred embodiment, the core front face is configured in the form of an in particular regular polygon having at least 4, preferably no more than 10, edges. Such a component is suitable particularly well for light mixing owing to the reflection of the light within the core, and then in particular as a waveguide rod. In particular, the entire core has in addition a corresponding core cross section throughout. Regular is here understood to mean in particular that the edges are in each case approximately of the same length and two respectively neighboring edges are arranged at an identical angle with respect to one another.

The core is then preferably surrounded by an annular cladding having, for example, a circular outer contour and a correspondingly non-circular, in particular polygonal, inner contour. The width of the core in particular is approximately 100 µm to 1 mm, the width of the cladding is approximately 1 to 3 mm, i.e. the diameter of the entire component transversely to the longitudinal direction is approximately 2 to 7 mm. The component preferably has a length which ranges approximately from 1 to 5 cm.

The coating is preferably composed of chromium or titanium and preferably has a layer thickness of at least 100 nm and no more than 500 nm. Such a coating has optimum reflection and/or absorption properties for avoiding input of light via the cladding front face.

The method is suitable in principle for applying a coating onto an end face of any desired optical component. What is essential here is in particular the selective light guidance of the component, and that the component has two end faces, one of which is intended to be selectively coated, in that light for the exposure is input during the production of the mask via the other end face. It is thus possible, in addition to the above described waveguide rods, to also easily provide for example planar light waveguide chips with a corresponding coating or even regular optical fibers for signal transmission. In principle, the cladding does not necessarily have to surround the light-guiding core completely. However, the cladding typically surrounds the core completely in the circumferential direction.

BRIEF DESCRIPTION OF THE SEVERAL VIEWS OF THE DRAWING

Exemplary embodiments of the invention will be explained in more detail below with reference to a drawing, in which schematically.

DESCRIPTION OF THE INVENTION

Figures 1, 2, 3:
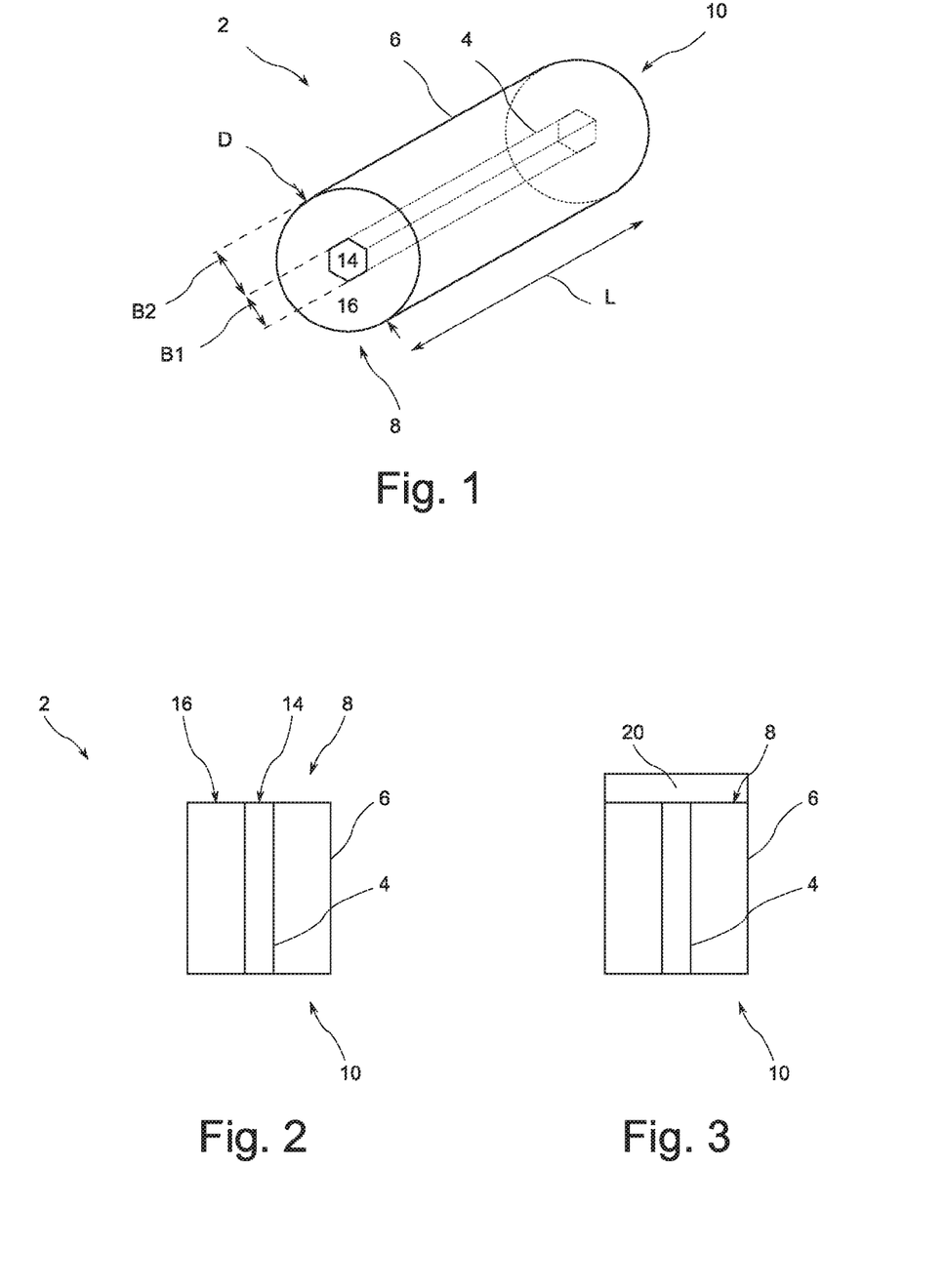
FIG. 1 shows an optical component in oblique view.
FIG. 2 shows the component in a side sectional view.
FIG. 3 shows the application of a lacquer layer.

FIG. 1 shows an optical component 2, in the present case in the form of a waveguide rod made of quartz. The component 2 comprises a core 4, which is embedded in a cladding 6. The core 4 and the cladding 6 form in each case a functional region 4, 6 of the component 2. The core 4 is here non-circular, in particular hexagonal, with the result that the component 2 is suitable in particular as a light mixer.

The core 4 serves for light transmission from a first, in the present case front-most, end face 8 to a second, in the present case rear-most, end face 10 and/or vice versa. Light guiding through the core 4 is here realized by way of total internal reflection at the boundary surface between cladding 6 and core 4. The entire component 2 has a diameter D, which in the present case corresponds to approximately 3 mm. The core 4 has a width B1, which is here a minimum width, i.e. is measured as the distance of two opposite sides and, in the exemplary embodiment illustrated here, is approximately 500 µm. The cladding 6 has a width B2, which, owing to the rotationally symmetrical configuration, corresponds to a wall thickness of the cladding 6, and in FIG. 1 is approximately 1.25 mm. The component 2 also has a length L, which corresponds to the distance between the two end faces 8, 10 and is here approximately 2 cm.

On the first end face 8, the core 4 and the cladding 6 in each case form a front face 14, 16, specifically a core front face 14 and a cladding front face 16. In the component 2 illustrated here, light is intended to be input into the component 2 during operation via the first end face 8, but only into the core 4; input of light into the cladding 6 is intended to be avoided. In addition, a coating 18 (not illustrated in FIG. 1) is selectively applied on the first end face 8, specifically only on the cladding front face 16, leaving the core front face 14 free. The coating 18 is here in particular made of an absorbing or reflective material, for example a metal. The method for applying the coating will be explained below in detail with respect to FIGS. 2 to 8.

To start, FIG. 2 shows the component 2 without coating in a side sectional view. Clearly visible are the core 4 and cladding 6. A coating is intended to be selectively applied on the first end face 8, which is oriented upwardly in FIG. 2. To this end, according to FIG. 3, first a lacquer layer 20 made of a photoresist is applied, by means of which the core front face 14 is intended to be masked. To this end, the lacquer layer 20 is applied onto the entire first end face 8 so as to subsequently be selectively exposed to light.

FIGS. 4a to 4d each show a variant of the selective exposure of the lacquer layer 20. The exposure to light is here generally effected from the rear side by means of a light source Q, the light of which, illustrated by arrows, is selectively input only into one of the regions 4, 6 via the second end face 10. The different exposure strategies differ in terms of the choice of the light source Q used for the exposure and also in in terms of the choice of the region 4, 6 into which the light is input.

Figure 4A:
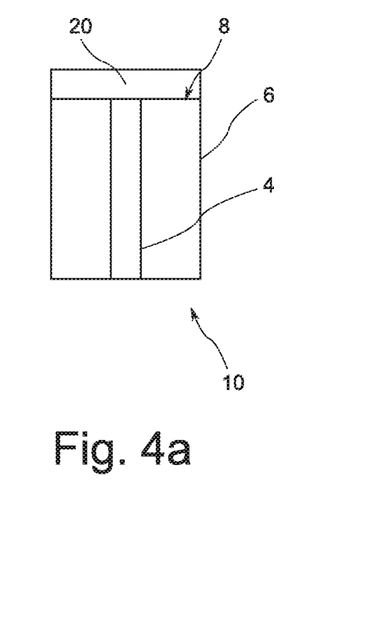
FIGS. 4a to 4d each show a variant for exposing the lacquer layer to light.
Figure 4B:
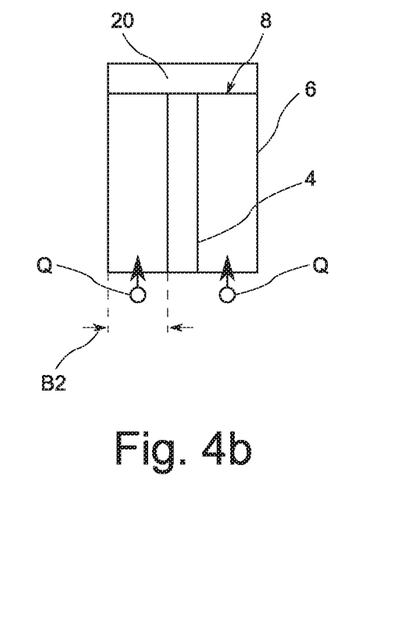

Specifically, FIG. 4a shows exposure via the core 4 by means of a light source Q, which has a transverse dimension A that is smaller than the width B1 of the core 4, in particular corresponds to at most half the width B1, and in the present case is approximately 200 µm, of the core diameter. As a result, light is input only into the core 4 and guided therethrough on the rear side to the lacquer layer 20, with the result that the latter is exposed to light only in the region of the core front face 14. Accordingly, FIG. 4b shows selective exposure of the lacquer layer 20 in the region of the cladding front face 16. To this end, in particular a plurality of light sources Q are used, the transverse dimension A of which is in each case smaller than the width B2 of the cladding 6.

Figure 4C:
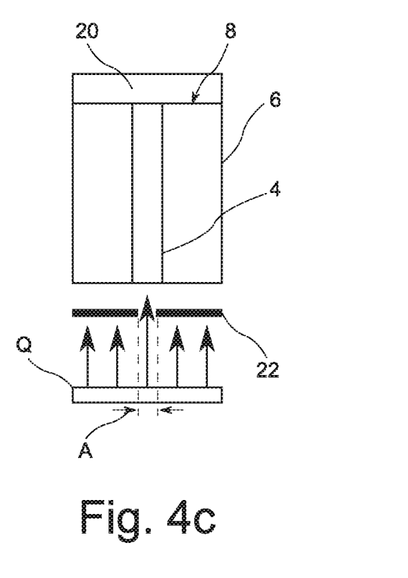
Figure 4D:
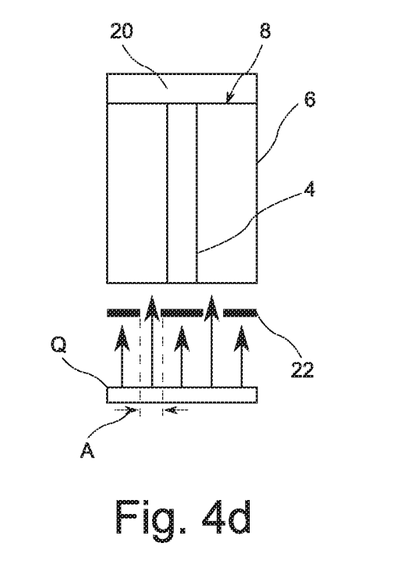

FIGS. 4c and 4d illustrate two further alternatives for exposure to light, in which in each case a stop 22 is used to correspondingly selectively input light from a light source Q, which in the present case emits light over a particularly large area, into one of the regions 4, 6. Analogously to FIGS. 4a and 4b, the stop 22 has an opening having a transverse dimension A, through which light from the light source Q passes. The stop 22 then simulates, in combination with the light source Q, a light source having a corresponding transverse dimension A. The transverse dimension A in the present case is also for example approximately 200 μm. Exposure is then effected optionally as in FIG. 4c via the core 4, or as in FIG. 4d via the cladding 6. In the latter case, in particular, the opening of the stop 22 is not necessarily circular, but in an alternative that is not illustrated here is, for example, annular and extends around the core 4.

One essential parameter that should be noted when selecting the light source Q and/or the stop 22 is primarily the collimation of the light, which is input into one of the regions 4, 6 via the second end face 10. On the one hand, the light should be sufficiently collimated so as to be incident on the boundary surface between the core 4 and the cladding 6 at an angle that is not too great and then couples into the respectively other region. In other words, the total internal reflection of the light must be ensured. On the other hand, the light should still be somewhat diffuse so as to be distributed during light guidance in the corresponding region 4, 6 and to completely illuminate the respective front face 14, 16. The collimation is suitably adjusted by way of a corresponding selection of the transverse dimension A of the light source Q or of the stop 22 and the distances thereof relative to the second end face 10.

Figure 5:
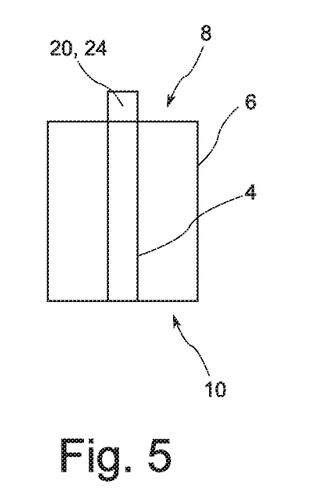
FIG. 5 shows the component with a mask.
Figure 6A:
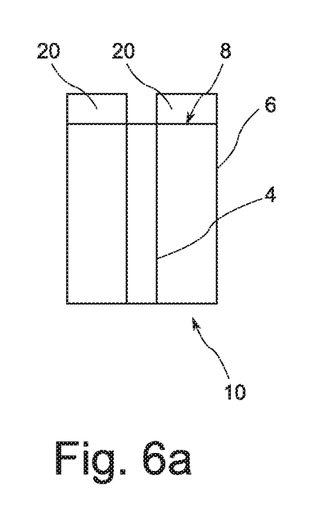
FIGS. 6a and 6b show optional intermediate steps for forming the mask.
Figure 6B:
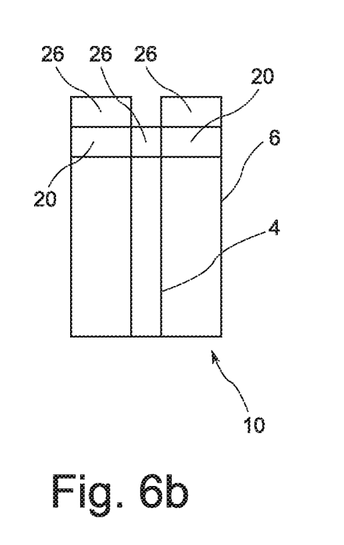

The selectively exposed lacquer layer 20, which is exposed according to one of FIGS. 4a to 4d, is subsequently developed to obtain the mask 24 illustrated in FIG. 5. Here, owing to the special exposure, the mask 24 masks exactly the core front face 14. The mask 24 can be variably formed depending on the selected exposure strategy and the type of the lacquer layer 20. In principle, four variants are possible: exposure of the core front face 14 in combination with a negative lacquer and also exposure of the cladding front face 16 in combination with a positive lacquer both directly bring about the result illustrated in FIG. 5 after the development of the lacquer layer 20. Alternatively, exposure of the core front face 14 takes place in combination with a positive lacquer or exposure of the cladding front face 16 takes place in combination with a negative lacquer, as a result of which during the development the lacquer layer 20 remains only on the cladding front face 16, as illustrated in FIG. 6a. This lacquer layer 20 is then, according to FIG. 6b, inverted using a second lacquer layer 26 in a manner known per se so as to finally arrive at the mask 24 of FIG. 5.

Figure 7:
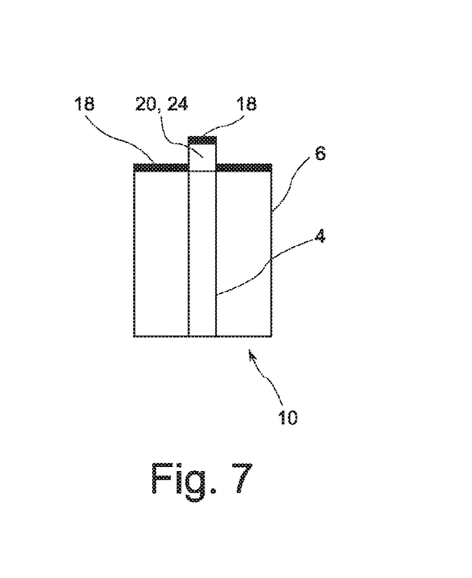
FIG. 7 shows the application of a coating.
Figure 8:
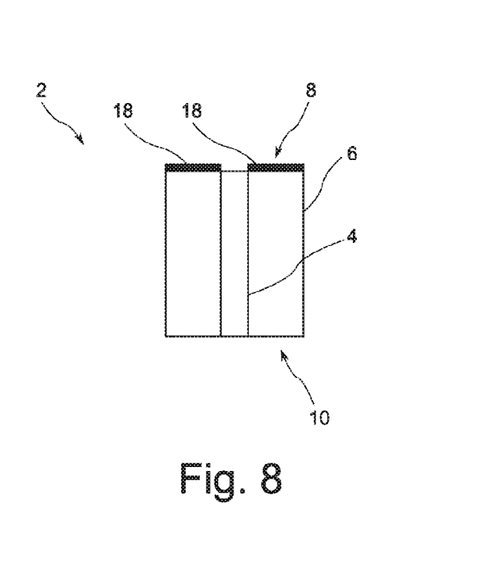
FIG. 8 shows the component having a finished selective coating.

FIG. 7 finally illustrates the application of the coating 18. The latter is applied initially onto the entire first end face 8, i.e. onto the uncovered cladding front face 16 and onto the masked core front face 14. The mask 24 with the part of the coating 18 that was applied thereto is subsequently removed, as a result of which the component 2 in the configuration illustrated in FIG. 8 with selective coating 18 is formed.

Figure 9:
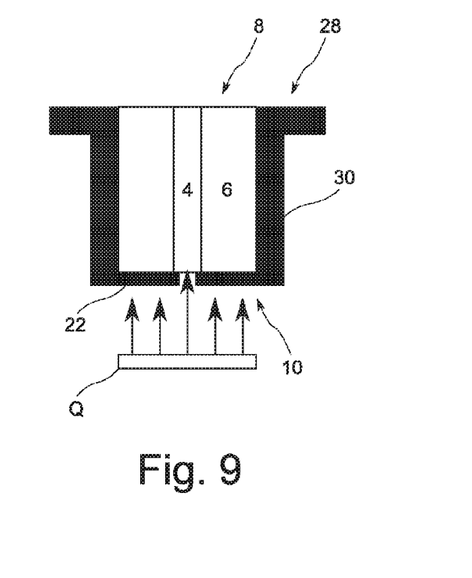
FIG. 9 shows the component in a holder.
Figure 10:
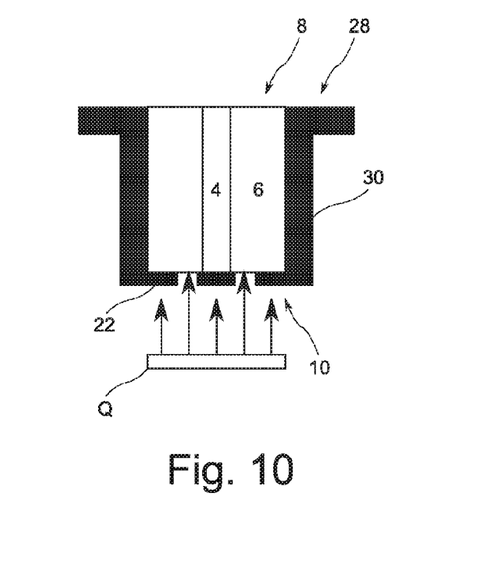
FIG. 10 shows the component in an alternative holder.

FIGS. 9 and 10 finally illustrate in each case a holder 28 having a receiving means 30, into which the component 2 can be inserted. The receiving means 30 furthermore comprises a stop 22, which is formed according to the exposure according to one of FIG. 4c or 4d. By integrating a stop functionality in the holder 28, quick and uncomplicated manufacture even of a plurality of selectively coated components 2 is possible. By way of the insertion of a respective component 2 in the receiving means 30, the stop 22 is automatically aligned in an optimum fashion. Any manufacturing tolerances here have no negative effect since the transverse dimension of the stop 22 is selected to be sufficiently small relative to the width B1, B2 of the region 4, 6, for example approximately half as large. In an alternative that is not illustrated here, the stop 22 and the receiving means 30 are not configured in one piece, but the stop 22 is rather a separate part and can be inserted into the receiving means 30.

The exposure of the lacquer layer 20 which is then applied later is substantially independent of the exact positioning of the stop 22 and primarily results from the uniform distribution of the light during guidance through the component 2. Complicated adjustment is thus dispensed with. In a further development which is not illustrated here, a holder 28 comprises a plurality of receiving means 30 in each case with a stop, with the result that a plurality of coated components 2 are manufactured at the same time in a batch method.

Figure 11:
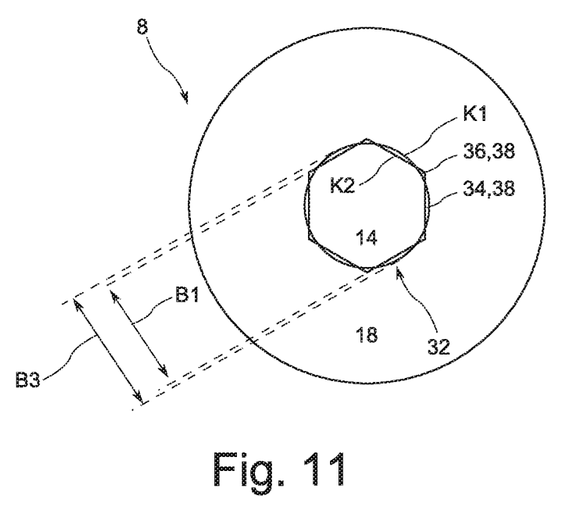
FIG. 11 shows a core front face and a coating according to the prior art.
Figure 12:
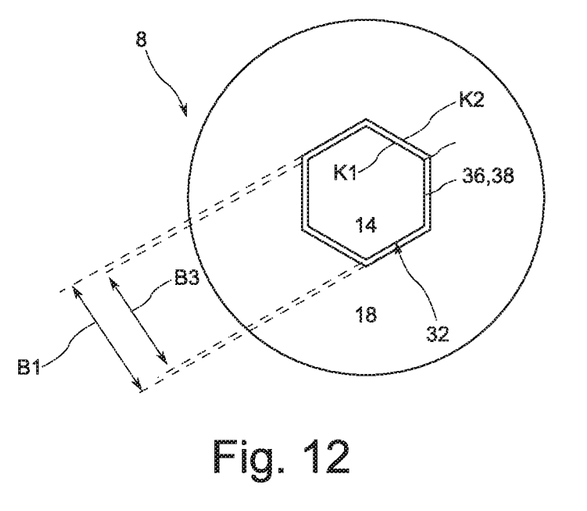
FIG. 12 shows the core front face having a coating according to the invention.

To more clearly illustrate the improved covering of the cladding front face 16 by means of the coating 18, FIGS. 11 and 12 each show the selectively coated first end face 8 of an optical component 2, the core front face 14 of which is accessible through a core opening 32 which is formed by the selective coating 18. Here, FIG. 11 illustrates a conventional coating 18 according to the prior art, wherein the core opening 32 does not follow the form of the core front face 14, i.e. the coating 18 overall is configured to not follow the form of the cladding front face 16. In the example illustrated in FIG. 11, the core opening 32 is circular, i.e. has a circular opening contour K1, while the core front face 14 is hexagonal, i.e. in the form of a uniform hexagon having a hexagonal outer contour K2. Owing to the configuration which does not follow the form, uncoated partial areas 34 are incorrectly formed on the cladding front face 16 and coated partial areas 36 are incorrectly formed on the core front face 14, which together form a defective area 38 which is correspondingly coated incorrectly.

In contrast, FIG. 12 follows the coating 18 in terms of form and size of the cladding front face 16, wherein in particular the core opening 32 also follows the core front face 14 in terms of form and size, i.e. is configured to be such that it follows the form thereof. Accordingly, in the exemplary embodiment illustrated here, the core opening 32 is likewise hexagonal, such that the defective area 38 is particularly strongly minimized. For better visibility, the defective area 38 in FIG. 12 is illustrated in strongly exaggerated fashion and somewhat smaller than the core front face 14, such that the coating 18 thereon forms an incorrectly coated partial area 36. In fact, the defective area 38 advantageously differs by no more than 1% from the core front face 14. In particular, the defective area 38 also has an opening width B3 which differs from the width B1 of the core front face 14 by less than 1%.

LIST OF REFERENCE SIGNS 2 optical component
4 core
6 cladding
8 first end face
10 second end face
14 core front face
16 cladding front face
18 coating
20 lacquer layer
22 stop
24 mask
26 second lacquer layer
28 holder
30 receiving means
32 core opening
34 uncoated partial area 36 coated partial area
38 defective area
A transverse dimension
B1, B2 width
B3 opening width
D diameter
K1 opening contour
K2 outer contour
L length
Q light source

The invention claimed is:

1. A method for applying a coating on a first end face of an optical component, the optical component having the first end face, a second end face, and two regions for guiding light, the two regions being a cladding and a core embedded in the cladding, the cladding forming a cladding front face on the first end face and the core forming a core front face on the first end face, the method comprising:
covering the core front face with a mask;
applying the coating onto the first end face;
removing the coating and the mask from the core front face; and
covering the core front face by applying a lacquer layer of a photo resist onto the first end face, exposing the photo resist to light from a rear side only in one of the cladding front face or the core front face, with light being input at the second end face of the component only in one of the two regions, and subsequently selectively removing the lacquer layer.

2. The method according to claim 1, wherein the step of exposing the lacquer layer comprises inputting the light into the one of the two regions to illuminate the associated front face completely from the rear side while preventing cross-talk of light into the other of the two regions.

3. The method according to claim 1, which comprises illuminating with a light source being a point light source.

4. The method according to claim 1, which comprises illuminating with a light source having a transverse dimension that is smaller than a width of the respective region in which the light is input.

5. The method according to claim 1, which comprises illuminating from a light source and via a stop, wherein the stop delimits a numerical aperture of the light source to a first numerical aperture that is at most as great as a second numerical aperture of the respective region in which the light is input.

6. The method according to claim 5, wherein the stop is formed by a receiving device of a holder in which the component is accommodated prior to the exposing step.

7. The method according to claim 5, wherein the stop is a separate part that is inserted into a receiving device of a holder in which the component is accommodated prior to the exposing step.

8. The method according to claim 5, which comprises placing the component into a holder prior to the exposing step and automatically aligning the first end face relative to the stop with the holder.

9. The method according to claim 8, wherein the holder has a plurality of receiving device for accommodating a plurality of optical components.

10. The method according to claim 9, which comprises performing the method steps in a batch method and simultaneously exposing a plurality of components to light.

11. The method according to claim 1, wherein the lacquer for forming the lacquer layer is a negative lacquer or a positive lacquer and the removing step comprises selectively removing the lacquer layer only from the non exposed or the exposed front face, respectively.

12. The method according to claim 1, wherein the core has a non-circular core cross section and the core front face is non-circular.

* * * * *